(12) United States Patent
Lee et al.

(10) Patent No.: US 10,919,517 B2
(45) Date of Patent: Feb. 16, 2021

(54) METHOD FOR CONTROLLING ENGINE POWER DURING CHARGE DEPLETING (CD) MODE HEATING

(71) Applicants: HYUNDAI MOTOR COMPANY, Seoul (KR); KIA MOTORS CORPORATION, Seoul (KR)

(72) Inventors: Yong-Hoon Lee, Incheon (KR); Dong-Jin Sohn, Gyeonggi-do (KR); Chun-Hyuk Lee, Gyeonggi-do (KR); Jee-Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 218 days.

(21) Appl. No.: 16/153,425

(22) Filed: Oct. 5, 2018

(65) Prior Publication Data

US 2019/0193715 A1   Jun. 27, 2019

(30) Foreign Application Priority Data

Dec. 27, 2017   (KR) .................. 10-2017-0181233

(51) Int. Cl.
*B60W 20/13* (2016.01)
*B60W 10/06* (2006.01)
*F02D 35/00* (2006.01)

(52) U.S. Cl.
CPC ............ *B60W 20/13* (2016.01); *B60W 10/06* (2013.01); *F02D 35/00* (2013.01);
(Continued)

(58) Field of Classification Search
CPC .. B60W 20/13; B60W 10/06; B60W 2555/20; B60W 2510/30;
(Continued)

(56) References Cited

U.S. PATENT DOCUMENTS 5,656,190 A * 8/1997 Aoki .................. F02D 41/1494
219/497
5,719,778 A * 2/1998 Suzumura .......... G01N 27/4067
700/207
(Continued)

FOREIGN PATENT DOCUMENTS

EP   1830197 A2 *  9/2007 ......... G01R 31/3648
EP   3216639 A1 *  9/2017 ............... B60K 6/46
(Continued)

OTHER PUBLICATIONS

Ying et al., "Numerical Research Engine Coolant Temperature and Flow Rate Effect on the Engine Cold Start," 2011, Publisher: IEEE.*
(Continued)

*Primary Examiner* — Tuan C To
(74) *Attorney, Agent, or Firm* — Morgan, Lewis & Bockius LLP

(57) ABSTRACT

In a method for controlling engine power during charge depleting (CD) mode heating of a plug-in hybrid electric vehicle (PHEV), the engine power is controlled according to an amount of heat of an engine required for heating determined using a level of an air-conditioning blower at a point in time at which an operation of the engine starts, an outdoor air temperature, and a coolant temperature, if a full automatic temperature controller (FATC) operates the engine for heating when the vehicle is driven in a CD mode.

10 Claims, 3 Drawing Sheets

(52) U.S. Cl.
CPC ..... *B60W 2510/30* (2013.01); *B60W 2555/20* (2020.02); *B60W 2710/0677* (2013.01); *F02D 2200/021* (2013.01); *F02D 2200/70* (2013.01)

(58) Field of Classification Search
CPC ............ B60W 2710/0677; F02D 35/00; F02D 2200/021; F02D 2200/70
USPC .......................................................... 701/22
See application file for complete search history.

(56) References Cited

U.S. PATENT DOCUMENTS

| | | | | |
|---|---|---|---|---|
| 5,782,227 | A * | 7/1998 | Abe | G01N 27/4067 123/689 |
| 10,428,756 | B2 * | 10/2019 | Velusamy | F02D 11/105 |
| 10,676,077 | B2 * | 6/2020 | Follen | B60L 7/10 |
| 2009/0063007 | A1 * | 3/2009 | Masuda | B60W 30/1882 701/102 |
| 2010/0219007 | A1 * | 9/2010 | Dalum | B60L 1/003 180/65.22 |
| 2011/0047981 | A1 * | 3/2011 | Roos | F01N 3/2026 60/286 |
| 2012/0208672 | A1 * | 8/2012 | Sujan | B60W 10/26 477/5 |
| 2014/0110081 | A1 * | 4/2014 | Porras | F01P 11/04 165/11.1 |
| 2014/0278002 | A1 * | 9/2014 | Okubo | B60W 10/06 701/103 |
| 2015/0094892 | A1 * | 4/2015 | Kanehara | B60W 10/08 701/22 |
| 2015/0183437 | A1 * | 7/2015 | Minamisawa | B60W 10/04 701/54 |
| 2015/0352962 | A1 * | 12/2015 | Hokoi | B60L 50/61 290/16 |
| 2016/0186856 | A1 * | 6/2016 | Sahlberg | F16H 59/64 701/55 |
| 2016/0297424 | A1 * | 10/2016 | Park | B60W 20/16 |
| 2017/0305412 | A1 * | 10/2017 | Okubo | B60W 10/06 |
| 2017/0334425 | A1 * | 11/2017 | Kato | B60K 6/40 |
| 2017/0355374 | A1 * | 12/2017 | Glugla | F02D 17/02 |
| 2017/0356375 | A1 * | 12/2017 | Glugla | B60W 10/06 |
| 2018/0148043 | A1 * | 5/2018 | Hokoi | B60W 20/14 |
| 2019/0061473 | A1 * | 2/2019 | Dykes | F02D 29/02 |
| 2019/0111761 | A1 * | 4/2019 | Jaglan | B60H 1/00964 |
| 2019/0193715 | A1 * | 6/2019 | Lee | B60W 10/06 |
| 2019/0389468 | A1 * | 12/2019 | Fritz | B60W 20/14 |

FOREIGN PATENT DOCUMENTS

| | | | | |
|---|---|---|---|---|
| JP | 2006291963 | A * | 10/2006 | ............ F02N 19/04 |
| JP | 2016199091 | A * | 12/2016 | |
| KR | 101510343 | B1 * | 4/2015 | ............. B60L 58/12 |
| KR | 101519789 | B1 * | 5/2015 | ............. B60W 20/40 |
| WO | WO-2017120884 | A1 * | 7/2017 | ........ H01M 10/0525 |

OTHER PUBLICATIONS

Yangang et al., "Integrated Liquid Cooling Automotive IGBT Module for High Temperatures Coolant Application," 2015, Publisher: VDE.*

Shweta et al., "Effect of Battery Capacity on the Performance of Plug-in Hybrid Electric Vehicles," 2009, Publisher: IEEE.*

* cited by examiner

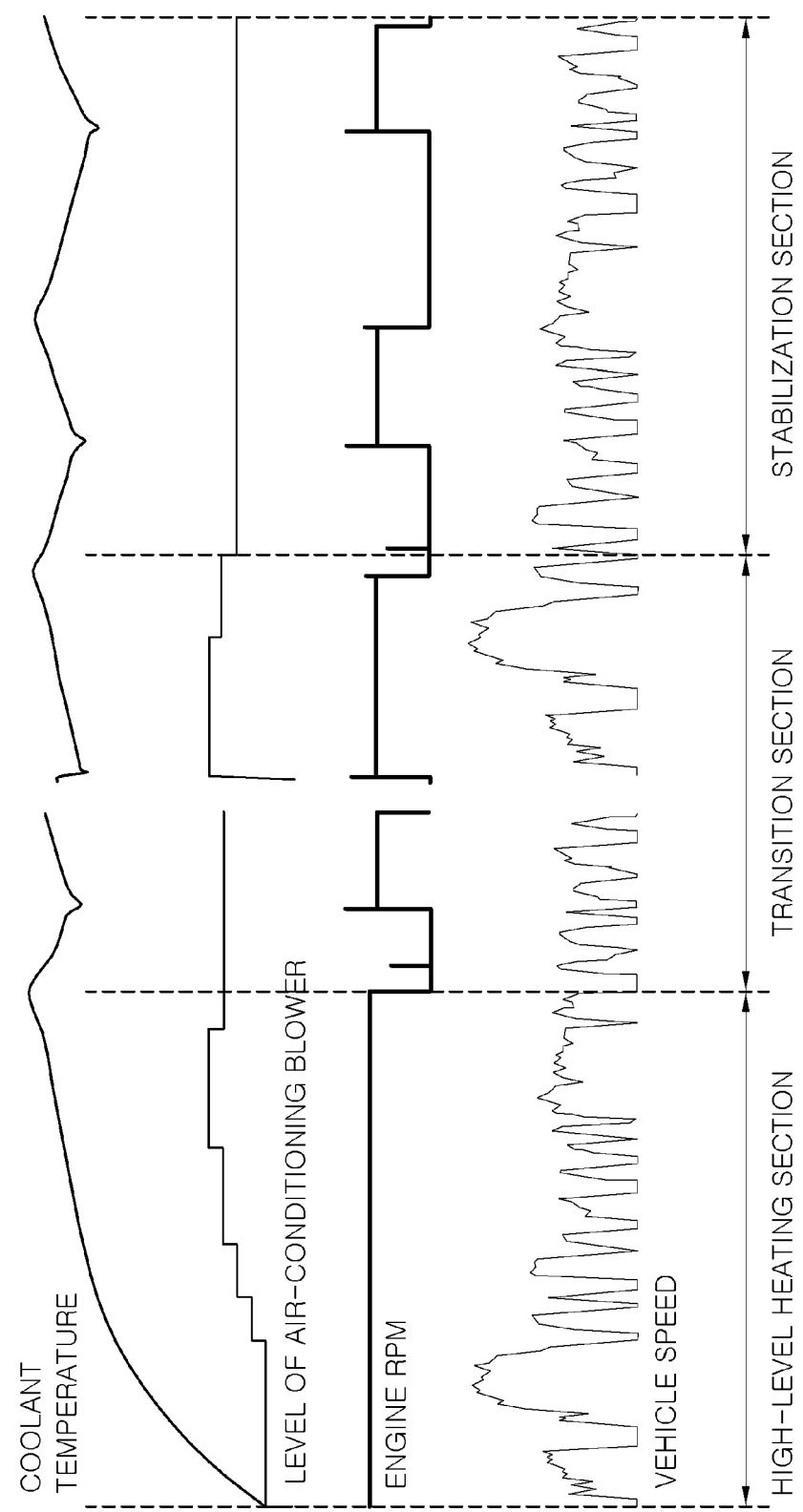

METHOD FOR CONTROLLING ENGINE POWER DURING CHARGE DEPLETING (CD) MODE HEATING

CROSS-REFERENCE TO RELATED APPLICATIONS

This application claims priority to Korean Patent Application No. 10-2017-0181233, filed on Dec. 27, 2017, the disclosure of which is incorporated herein by reference in its entirety.

TECHNICAL FIELD

The present disclosure relate to a method for controlling engine power during charge depleting (CD) mode heating of a plug-in hybrid electric vehicle (PHEV), and more particularly, to a method for optimally controlling engine power at the time of operating an engine for heating in a CD mode of a PHEV.

BACKGROUND

In a plug-in hybrid electric vehicle in which a high voltage positive temperature coefficient (PTC) heater is not installed, an engine is started when heating is needed during charge depleting (CD) driving to supply heat of the engine to an interior of the vehicle.

At this time, the heat of the engine is affected by engine power at the time of operating the engine, and in a technology according to the related art, a control specialized for a plug-in hybrid electric vehicle (PHEV) does not exist, as a result, even in the case of CD mode driving, the vehicle recognizes as being in a charge sustaining (CS) control in which a state of charge (SOC) is high, such that minimum engine power is selected to prevent overcharge (SOC).

However, since the CD mode driving of the PHEV is driving using the SOC, a control for preventing overcharge (SOC) is not needed. Accordingly, during heating at the time of CD mode driving of the PHEV, engine power is not controlled according to the SOC, but an optimal control for the engine power for improving fuel efficiency needs to be performed by finding a factor affecting a required amount of heat of the engine.

SUMMARY

An embodiment of the present disclosure is directed to a method for controlling engine power during CD mode heating of a plug-in hybrid electric vehicle (PHEV) capable of improving fuel efficiency by controlling engine power according to a factor affecting an amount of heat of an engine required for heating, rather than a state of charge (SOC) during heating at the time of CD mode driving of a PHEV.

Other objects and advantages of the present disclosure can be understood by the following description, and become apparent with reference to the embodiments of the present disclosure. Further, it is obvious to those skilled in the art to which the present disclosure pertains that the objects and advantages of the present disclosure can be realized by the means as claimed and combinations thereof.

In accordance with an embodiment of the present disclosure, in a method for controlling engine power during CD mode heating of a PHEV, engine power is controlled according to an amount of heat of an engine required for heating determined using a level of an air-conditioning blower at a point in time at which an operation of the engine starts, an outdoor air temperature, and a coolant temperature, if a full automatic temperature controller (FATC) operates the engine for heating when the vehicle is driven in a CD mode.

The engine power may be controlled by an engine power map set according to the level of the air-conditioning blower, the outdoor air temperature, and the coolant temperature.

The engine power map may be a map of an engine power value according to the outdoor air temperature and the coolant temperature, and may be divided into three stage maps of a high-stage engine power map, an intermediate-stage engine power map, and a low-stage engine power map according to the level of the air-conditioning blower.

The engine power map may have a form in which as the outdoor air temperature and the coolant temperature are decreased, the engine power is increased, and as the outdoor air temperature and the coolant temperature are increased, the engine power is decreased.

In accordance with an embodiment of the present disclosure, a method for controlling engine power during CD mode heating of a PHEV includes: a CD mode determination step of determining whether the vehicle is driven in a CD mode; an air-conditioning blower stage determination step of determining a stage of an air-conditioning blower according to a level of the air-conditioning blower; an engine power map selection step of selecting an engine power map according to the stage of the air-conditioning blower determined in the air-conditioning blower stage determination step; an engine power setting step of setting optimal engine power by monitoring an outdoor air temperature and a coolant temperature according to the engine power map for each stage of the air-conditioning blower selected in the engine power map selection step; and an engine turning-on step of operating an engine by the engine power set in the engine power setting step.

The engine power map may be a map of an engine power value according to the outdoor air temperature and the coolant temperature, and may be divided into three stage maps of a high-stage engine power map, an intermediate-stage engine power map, and a low-stage engine power map according to the level of the air-conditioning blower.

The engine power map may have a form in which as the outdoor air temperature and the coolant temperature are decreased, the engine power is increased, and as the outdoor air temperature and the coolant temperature are increased, the engine power is decreased.

In the CD mode determination step, whether or not the vehicle is driven in the CD mode may be determined based on a CD mode control signal transmitted from a hybrid control unit (HCU) through controller area network (CAN) communication.

In the air-conditioning blower stage determination step, the stage of the air-conditioning blower may be determined by dividing the stage of the air-conditioning blower into three stages of a high stage, an intermediate stage, and a low stage.

The engine power map selection step may include a high-stage engine power map selection step, an intermediate-stage engine power map selection step, and a low-stage engine power map selection step.

In the engine turning-on step, the engine power set in the engine power setting step may be maintained until the engine is turned off.

The method may further include a CS mode heating step of performing CD mode heating when it is determined that the vehicle is not driven in the CD mode in the CD mode determination step.

BRIEF DESCRIPTION OF THE DRAWINGS

FIG. 3 is a diagram illustrating a high-level heating section, a transition section, and a stabilization section during the CD mode heating of a PHEV according to the present disclosure.

DESCRIPTION OF SPECIFIC EMBODIMENTS

Hereinafter, a method for controlling engine power during charge depleting (CD) mode heating of a plug-in hybrid electric vehicle (PHEV) according to the present disclosure will be described in detail with reference to the accompanying drawings. However, detailed descriptions for well-known functions or configurations will be omitted in order not to unnecessarily obscure the gist of the present disclosure.

In a method for controlling engine power during CD mode heating of a PHEV according to the present disclosure, at the time of driving of the vehicle in a CD mode, if a full automatic temperature controller (FATC) operates an engine for heating, engine power is controlled according to an amount of heat of the engine required for the heating that is determined using a level of an air-conditioning blower at a point in time at which the operation of the engine starts, an outdoor air temperature, and a coolant temperature.

Further, in the method for controlling engine power during CD mode heating of a PHEV according to the present disclosure, the engine power is controlled by an engine power map set according to a level of the air-conditioning blower, an outdoor air temperature, and a coolant temperature.

Figure 1:
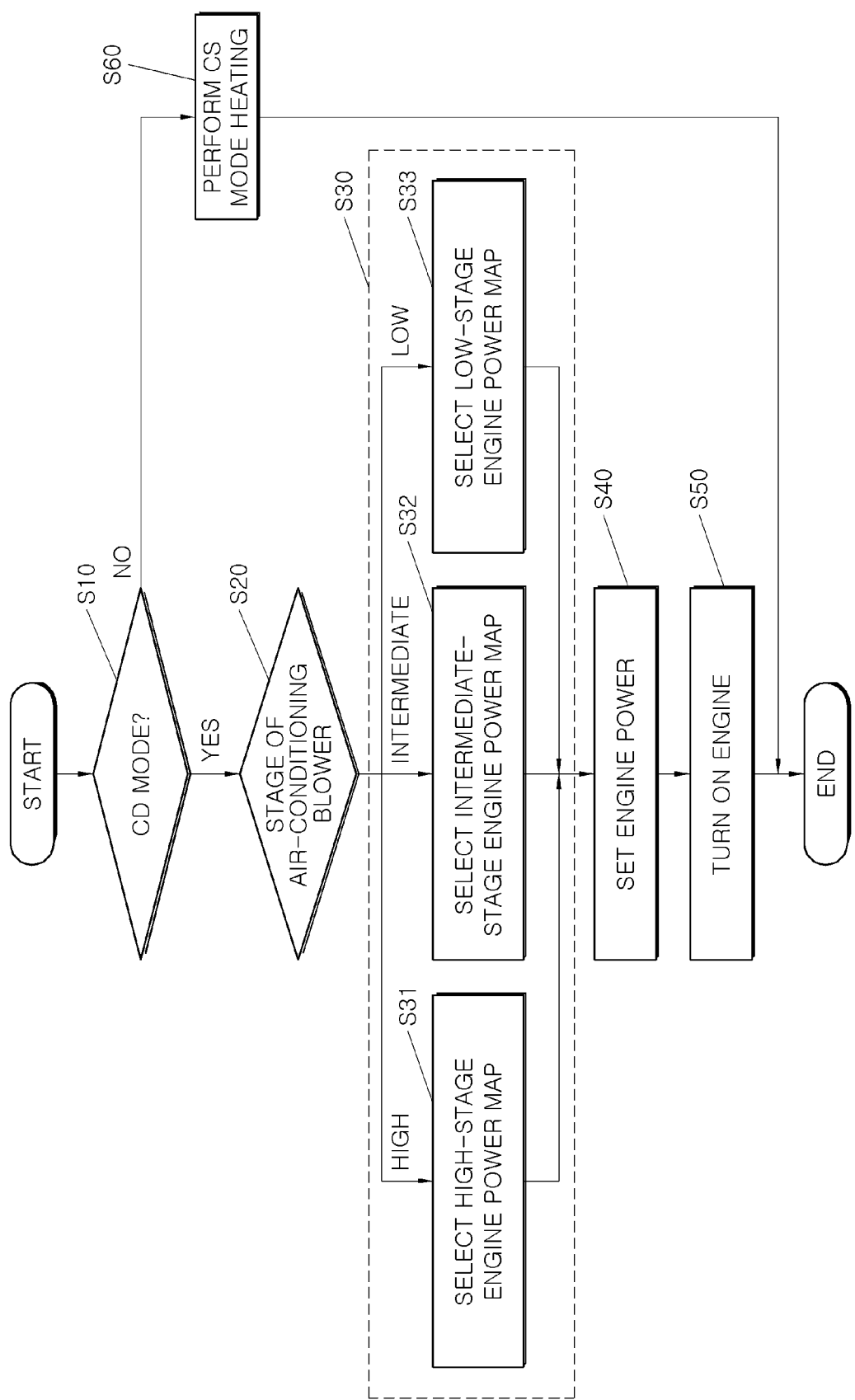
FIG. 1 is a flow chart illustrating a method for controlling engine power during charge depleting (CD) mode heating of a plug-in hybrid electric vehicle (PHEV) according to the present disclosure.

FIG. 1 is a flow chart illustrating a method for controlling engine power during CD mode heating of a PHEV according to the present disclosure.

Referring to FIG. 1, a method for controlling engine power during CD mode heating of a PHEV according to the present disclosure includes a CD mode determination step (S10), an air-conditioning blower stage determination step (S20), an engine power map selection step (S30), an engine power setting step (S40), an engine turning-on step (S50), and a charge sustaining (CS) mode heating step (S60).

The CD mode termination step (S10) is a step of determining whether or not the vehicle is driven in the CD mode based on a CD mode control signal transmitted from a hybrid control unit (HCU) through controller area network (CAN) communication.

When it is determined that the vehicle is driven in the CD mode in the CD mode determination step (S10), in the air-conditioning blower stage determination step (S20), a stage of the blower is determined by dividing the stage of the blower into three stages of a high stage, an intermediate stage, and a low stage according to a level of the blower.

The engine power map selection step (S30) is a step of selecting an engine power map set in advance according to the stage of the blower determined in the air-conditioning blower stage determination step (S20), and includes a high-stage engine power map selection step (S31), an intermediate-stage engine power map selection step (S32), and a low-stage engine power map selection step (S33).

Figure 2:
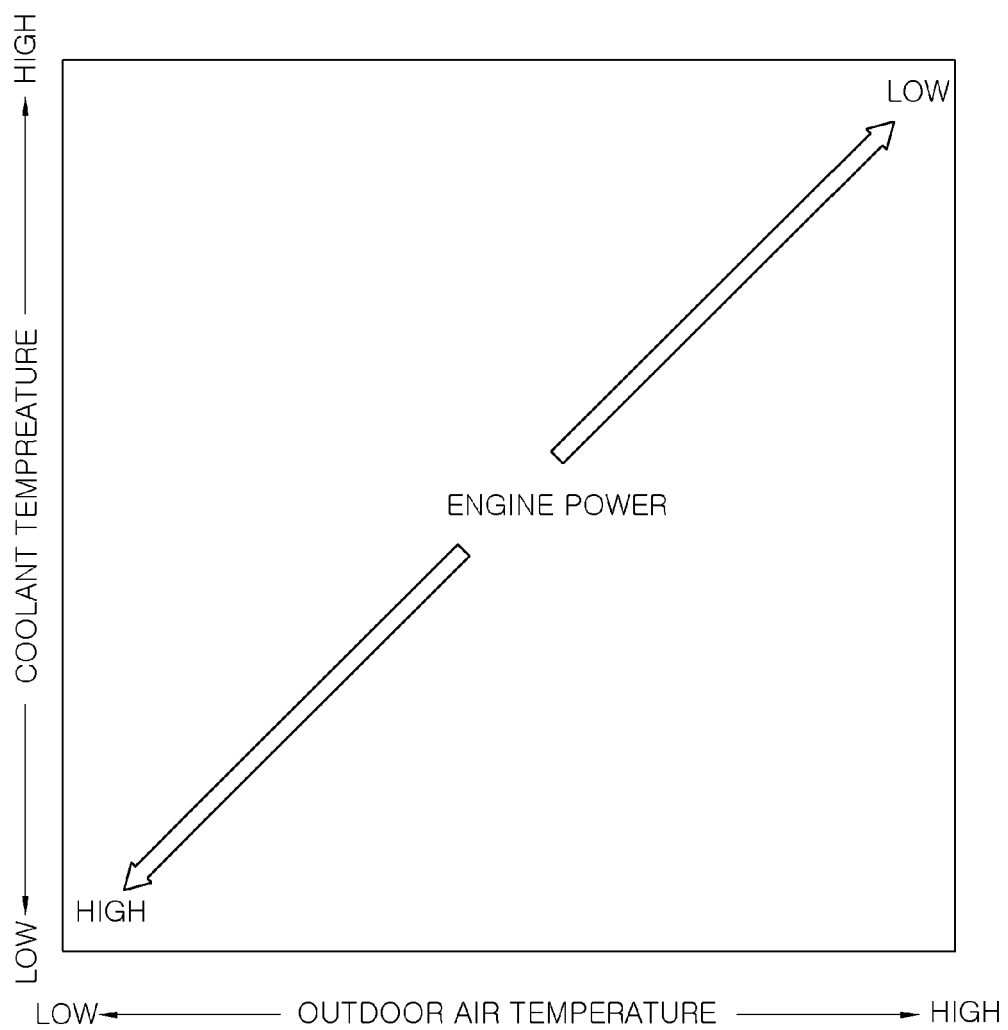
FIG. 2 is a diagram illustrating a form of an engine power map used in the present disclosure.

FIG. 2 is a diagram illustrating a form of an engine power map used in the present disclosure.

Referring to FIG. 2, the engine power map according to the present disclosure is a map of an engine power value according to an outdoor air temperature and a coolant temperature, and is divided into three stage maps of a high-stage engine power map, an intermediate-stage engine power map, and a low-stage engine power map according to a level of the blower.

The high-stage engine power map, the intermediate-stage engine power map, and the low-stage engine power map are different from each other only in an overall level of the engine power value, and in all of the high-stage engine power map, the intermediate-stage engine power map, and the low-stage engine power map, as the outdoor air temperature and the coolant temperature are decreased, the engine power is increased, and as the outdoor air temperature and the coolant temperature are increased, the engine power is decreased.

Accordingly, the high-stage engine power map and the intermediate-stage engine power map are used in the high-level heating section in which the required amount of heat for heating is large, and the low-stage engine power map is used in the transition section and the stabilization section in which the required amount of heat for heating is small.

FIG. 3 is a diagram illustrating a high-level heating section, a transition section, and a stabilization section during the CD mode heating of a PHEV according to the present disclosure.

Referring to FIG. 3, the high-level heating section is a heating section in which the coolant temperature and the outdoor air temperature are similar to each other like they are at the time of first starting of the engine in the CD mode of the PHEV, and the level of the blower corresponds to the high/intermediate stage, in which as a difference between the outdoor air temperature and the coolant temperature is decreased, the engine power may be increased by determining that there is little heat of the engine.

The transition section and the stabilization section are heating sections in which the coolant temperature is sufficiently higher than the outdoor air temperature after the first operation of the engine in the CD mode of the PHEV, in which since the amount of heat of the engine required to be supplied to the interior is decreased, the engine power may be decreased.

According to the embodiment of the present disclosure, in the high-stage and intermediate-stage engine power maps used in the high-level heating section, engine power may be set to engine power capable of enabling the interior temperature to be increase to a predetermined temperature set by the FATC through a test within a range of engine power that may be charged using a hybrid starter generator (HSG), and in the low-stage engine power map used in the transition section and the stabilization section, engine power may be set to minimum power that may be used as engine part load (the engine does not perform a speed control and only performs an engine torque control capable of outputting set engine power) using the HSG and to engine power capable of minimizing a fuel consumption amount through a test in the high-level heating section.

The engine power setting step (S40) is a step of setting optimal engine power by monitoring the outdoor air temperature and the coolant temperature according to the engine power map selected in the engine power map selection step (S30).

The engine turning-on step (S50) is a step of operating the engine with the engine power set in the engine power setting step (S40), and at this time, the engine power is maintained until the engine is turned off, thereby preventing a decrease in fuel efficiency due to a change of an ignition angle, an amount of fuel, and the like according to a change of the engine power during the operation of the engine.

The CS mode heating step (S60) is a step of performing the conventional CS mode heating when it is determined that the vehicle is not driven in the CD mode, that is, the vehicle is driven in the CS mode in the CD mode determination step (S10).

The method for controlling engine power during CD mode heating of a PHEV according to the present disclosure may also be used in a vehicle in which a high voltage PTC heater is mounted, and in this case, the engine power is optimized during the CD mode driving by the combination of the high voltage PTC heater and the engine.

In accordance with the embodiments of the present disclosure, in the method for controlling engine power during CD mode heating of a PHEV, the engine power is optimally controlled according to an amount of heat of an engine required for heating, thereby rapidly satisfying a demand of a user for heating and improving fuel efficiency.

The embodiments disclosed in the present specification and the accompanying drawings are used only for the purpose of describing the technical idea of the present disclosure and are not used to limit the scope of the present disclosure described in the appended claims. Therefore, it will be understood by those skilled in the art that various modifications may be made and that other equivalent embodiments are available.

What is claimed is:

1. A method for controlling engine power during charge depleting (CD) mode heating of a plug-in hybrid electric vehicle (PHEV), wherein the engine power is controlled according to an amount of heat of an engine required for heating using a level of an air-conditioning blower at a point in time at which an operation of the engine starts, an outdoor air temperature, and a coolant temperature, if a full automatic temperature controller (FATC) operates the engine for heating when the vehicle is driven in a CD mode,
   wherein the engine power is controlled by an engine power map set according to the level of the air-conditioning blower, the outdoor air temperature, and the coolant temperature,
   wherein, as the outdoor air temperature and the coolant temperature decreased the engine power increases, and
   wherein, as the outdoor air temperature and the coolant temperature increase, the engine power decreases.

2. The method of claim 1, wherein the engine power map is a map of an engine power value according to the outdoor air temperature and the coolant temperature, and is divided into three stage maps of a high-stage engine power map, an intermediate-stage engine power map, and a low-stage engine power map according to the level of the air-conditioning blower.

3. A method for controlling engine power during charge depleting (CD) mode heating of a plug-in hybrid electric vehicle (PHEV), the method comprising:
   a CD mode determination step of determining whether or not the PHEV is driven in a CD mode;
   an air-conditioning blower stage determination step of determining a stage of an air-conditioning blower according to a level of the air-conditioning blower;
   an engine power map selection step of selecting an engine power map according to the stage of the air-conditioning blower determined in the air-conditioning blower stage determination step;
   an engine power setting step of setting optimal engine power by monitoring an outdoor air temperature and a coolant temperature according to the engine power map for each stage of the air-conditioning blower selected in the engine power map selection step; and
   an engine turning-on step of operating an engine by the engine power set in the engine power setting step.

4. The method of claim 3, wherein the engine power map is a map of an engine power value according to the outdoor air temperature and the coolant temperature, and is divided into three stage maps of a high-stage engine power map, an intermediate-stage engine power map, and a low-stage engine power map according to the level of the air-conditioning blower.

5. The method of claim 4, wherein as the outdoor air temperature and the coolant temperature decrease, the engine power increases, and as the outdoor air temperature and the coolant temperature increase, the engine power decreases.

6. The method of claim 3, wherein in the CD mode determination step, whether or not the vehicle is driven in the CD mode is determined based on a CD mode control signal transmitted from a hybrid control unit (HCU) through controller area network (CAN) communication.

7. The method of claim 3, wherein in the air-conditioning blower stage determination step, the stage of the air-conditioning blower is determined by dividing the stage of the air-conditioning blower into three stages of a high stage, an intermediate stage, and a low stage.

8. The method of claim 3, wherein the engine power map selection step includes a high-stage engine power map selection step, an intermediate-stage engine power map selection step, and a low-stage engine power map selection step.

9. The method of claim 3, wherein in the engine turning-on step, the engine power set in the engine power setting step is maintained until the engine is turned off.

10. The method of claim 3, further comprising: a charge sustaining (CS) mode heating step of performing the CD mode heating when it is determined that the vehicle is not driven in the CD mode in the CD mode determination step.

* * * * *